United States Patent [19]
Pennington

[11] 3,791,218
[45] Feb. 12, 1974

[54] APPARATUS FOR REMOVING SAMPLES OF PARTICULATE MATERIALS FROM AN ENDLESS BELT CONVEYOR

[75] Inventor: Fred A. Pennington, Harrisburg, Pa.

[73] Assignee: D & P Minerals, Inc., Harrisburg, Pa.

[22] Filed: Jan. 5, 1972

[21] Appl. No.: 215,584

[52] U.S. Cl. ............................. 73/423 R, 73/421 R
[51] Int. Cl. ............................................ G01n 1/10
[58] Field of Search ........... 73/423 R, 421 R, 424 R

[56] References Cited
UNITED STATES PATENTS

| | | | |
|---|---|---|---|
| 3,545,280 | 12/1970 | Gosney | 73/424 R X |
| 3,181,369 | 5/1965 | Taylor | 73/423 R |
| 2,977,800 | 4/1961 | Jordison | 73/423 R |

FOREIGN PATENTS OR APPLICATIONS

| 622,223 | 6/1961 | Canada | 73/421 R |
|---|---|---|---|

Primary Examiner—Richard C. Queisser
Assistant Examiner—Daniel M. Yasich

[57] ABSTRACT

Representative quantities of ores and other particulate materials are removed, when desired, from the upper flight of a substantially horizontally disposed, transversely concave, endless belt conveyor by a relatively narrow elongate scoop which is pivotally suspended from above with its lower end normally extending in an upstream direction and into close proximity, or contact, with the surface of the upper flight of the endless belt conveyor. After the desired sample has been received through an inlet port in the elongate scoop, the normally lower end of the latter is raised and the particulate materials are permitted to flow by gravity through the remainder of the elongate scoop and discharged through an outlet port in the normally upper end and fed onto a cross-conveyor which transfers the sample to wherever desired. The raising of the free end of the pivotally mounted elongate scoop causes it to move through an arc which extends longitudinally of the endless belt conveyor; and additional pivotal means are provided for moving the lower end of the elongate scoop through an arc which extends transversely with respect to the endless belt conveyor. Through this last-named means the lower end of the elongate scoop may be so adjusted that the inlet port thereof receives samples of particulate material from different positions transversely of the moving stream.

6 Claims, 4 Drawing Figures

PATENTED FEB 12 1974

APPARATUS FOR REMOVING SAMPLES OF PARTICULATE MATERIALS FROM AN ENDLESS BELT CONVEYOR

This invention relates to the sampling of ores and other particulate material while a mass thereof is moving along the transversely concave upper flight of a substantially horizontally disposed endless belt conveyor.

Endless belt conveyors for conveying particulate materials of the type described are frequently of substantial width, such as eight feet, and travel at relatively high linear speeds, for example eight hundered feet per minute. To stop the movement of the endless belt conveyor while the desired sample is being taken is very uneconomical; and it has heretofore been proposed to scoop off, or otherwise remove a mass of material which extends across its full width. This, of course, results in the very thorough mixing of the removed mass.

For numerous reasons it is at times highly desirable to remove a representative sample of the material moving longitudinally with the conveyor from a mass which does not extend entirely across the total width thereof, but is relatively narrow.

Accordingly, it is among the objects of the present invention to efficiently remove from a mass of particulate material which is moving at regular speed on the upper flight of an endless belt conveyor a pre-selected segment which is relatively narrow with respect to the total width of the moving mass.

Another object is the attainment of the foregoing with an apparatus which is readily adjusted into one of a number of different positions with respect to the width of the mass of the material from which the sample is to be taken.

Still another object is to provide a sample removing means having the advantages described and which transfers the sample so collected to a conveying instrumentality which delivers it to a station whereat the desired analysis may be made or to a point for further distribution.

A further object is the provision of an apparatus for achieving the aforementioned ends which is relatively simple and inexpensive to manufacture, install, operate and maintain.

The foregoing and other objects and advantages will become more readily understood from the following description and annexed drawings, wherein like reference characters designate like parts, and wherein.

Referring more particularly to the drawings, the numeral 1 generally designates a suitably driven, substantially horizontally disposed, endless belt conveyor which is trained around end rolls and supported intermediate its ends by a series of transversely extending supporting rolls, all in the manner well-known in the art.

Figure 1:
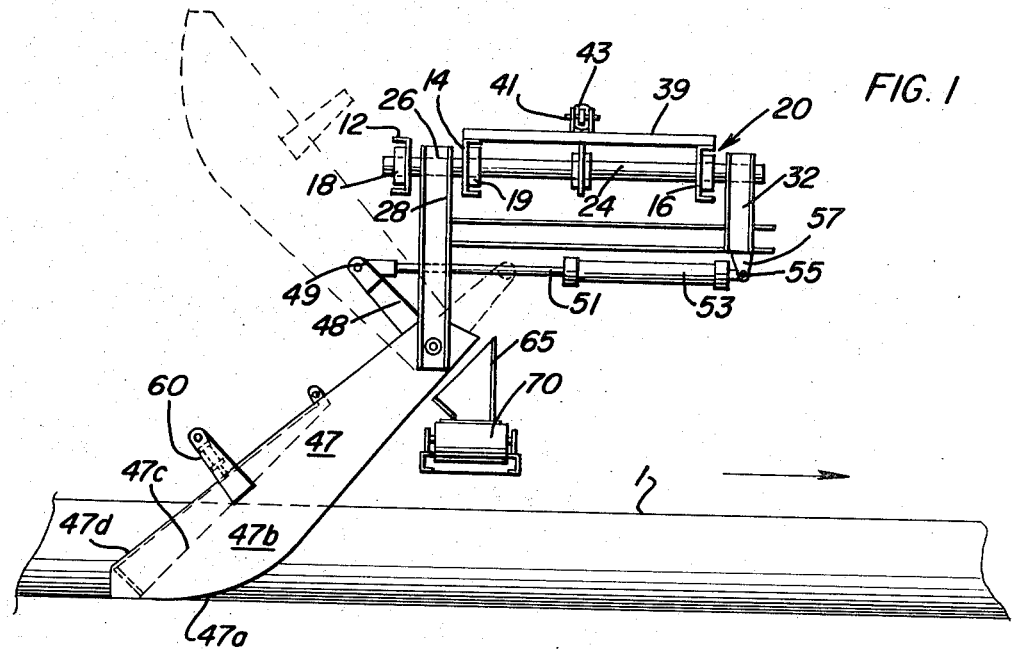
FIG. 1 is a schematic elevational view illustrating a form of apparatus which embodies the teachings of the present invention.
Figure 2:
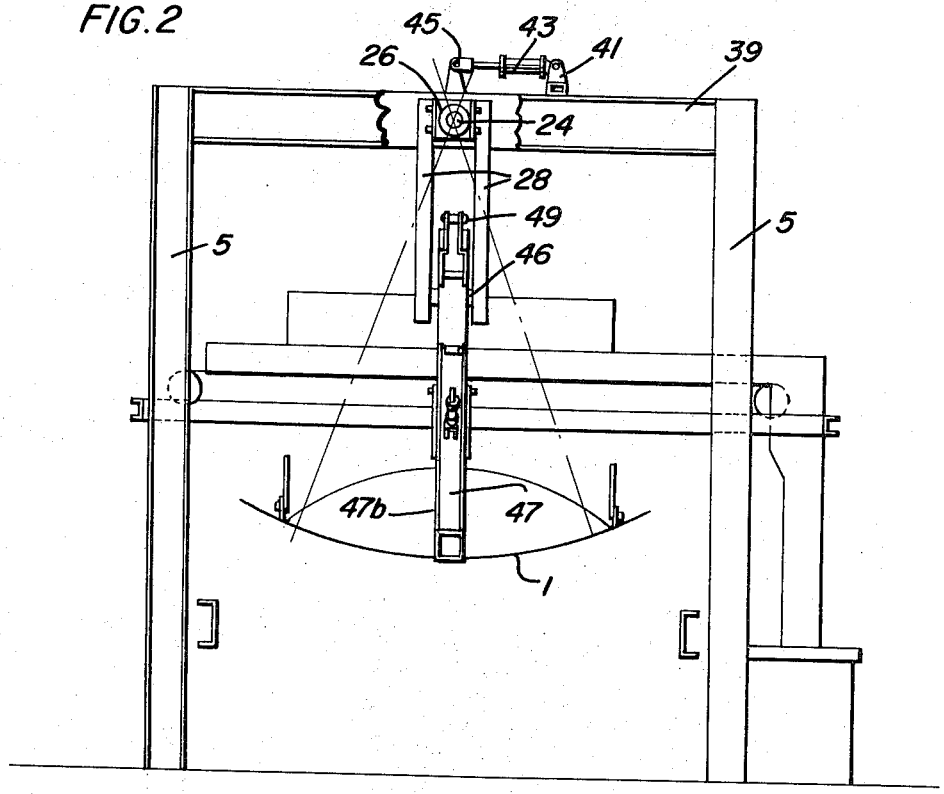
FIG. 2 is a view of the apparatus which is taken at right-angles from the showing of FIG. 1 and from a position which is upstream with respect to that portion of the endless belt conveyor which is moving under the apparatus.
Figure 3:
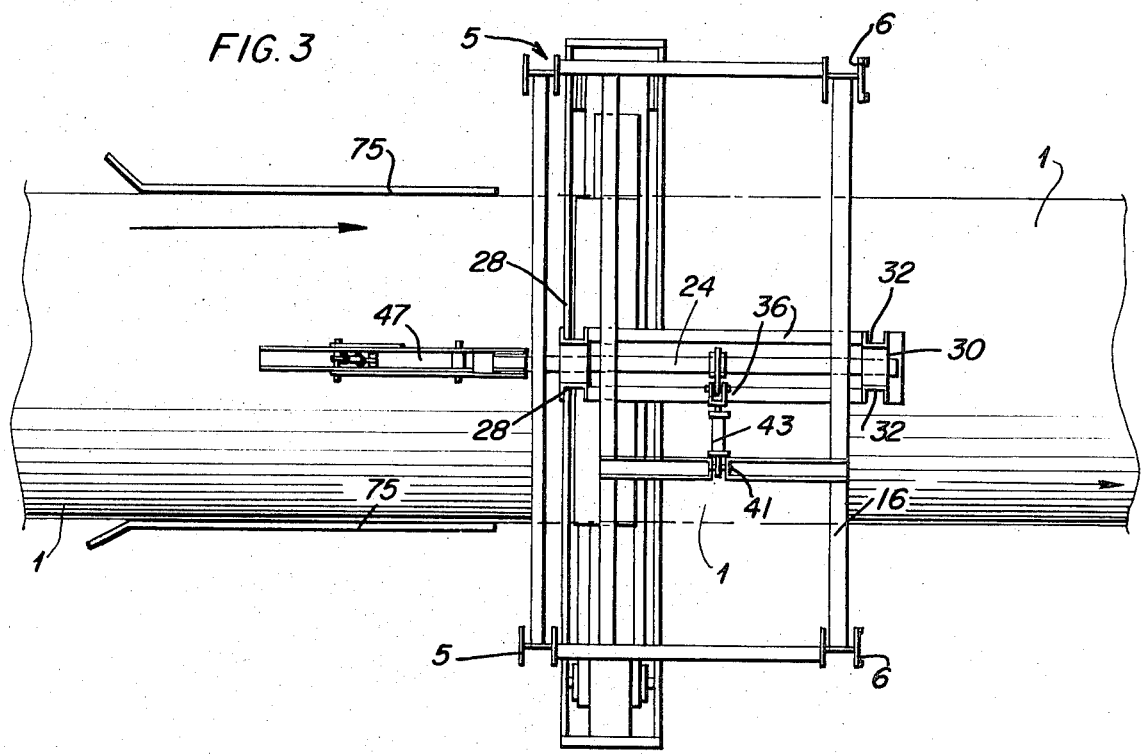
FIG. 3 is a plan view of the apparatus.
Figure 4:
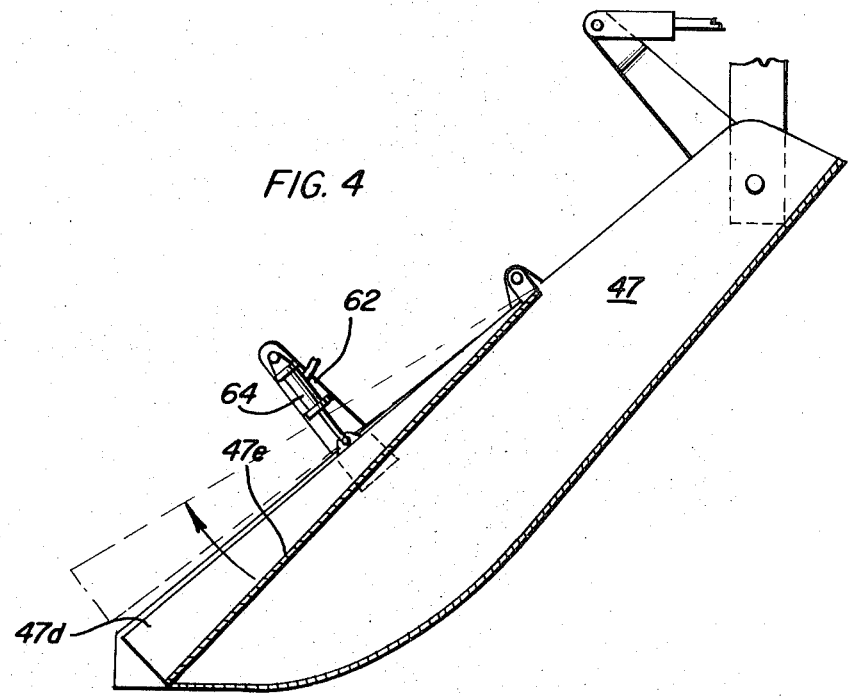
FIG. 4 is an elevational view, partly in section, and on an enlarged scale, illustrating in greater detail the scoop member of the apparatus.

The direction of movement of the endless belt conveyor 1 is indicated by the arrow in both FIG. 1 and FIG. 3.

Disposed at either side of the endless belt conveyor 1, but adjacent thereto, is a forward vertically extending supporting column 5 and a substantially spaced and parallel rearward vertically extending supporting column 6 (FIG. 3). These vertically extending supporting columns 5—5 and 6—6 are in alignment transversely of the endless belt conveyor 1, and may comprise conventional structural members, such as H-beams, I-beams, channels, etc., in suitable number and arrangement.

Extending between and connecting the forward vertically extending supporting columns 5—5 is a pair of substantially spaced horizontally disposed and parallel channel members 12 and 14 which are shown in back-to-back relationship.

A similar and single horizontally disposed and rearwardly facing channel member 16 is shown as extending between and connecting the parallel rearward supporting column 6—6.

The web of each of the channel members 12, 14 and 16 is apertured and provided thereat with an anti-friction bearing, the same being indicated at 18, 19 and 20, respectively.

A rotatable shaft 24 is journaled in the bearings 18, 19 and 20; and secured to this shaft 24 is a block 26 which is disposed between the channel members 12 and 14. This block 26 carries a pair of relatively closely spaced depending arms 28 that may be formed of outward facing channel members.

The rearward end of the rotatable shaft 24 projects rearwardly from the channel 16 and anti-friction bearing 20; and secured thereto is a block 30 which carries a pair of depending arms 32 that are in parallelism with the arms 28.

As shown in FIG. 1, the depending arms 32 are considerably shorter than the depending arms 28 and are connected thereto by forwardly extending rails 36.

Extending between and secured to the parallel horizontally disposed channel members 12 and 14 is a rail 39 on which there is a bracket 41 carrying a pivotally mounted fluid cylinder 43. The piston rod of this fluid cylinder 43 is pivotally connected to one end of a link 45 which is secured at its other end to the rotatable shaft 24.

According to the foregoing construction and arrangement of elements, there is provided a sturdy frame which is disposed above and in parallelism with the longitudinal center-line of the endless belt conveyor 1, and adapted for pivotal movement with respect thereto about the axis of the shaft 24.

Extending between the first-mentioned depending arms 28, and adjacent the lower ends thereof, is a shaft 46 which extends at right-angles to the longitudinal axis of the endless belt conveyor and pivotally supports the rearward and normally higher end of an elongate scoop scoop 47 having at its lower end an inlet opening which in an upstream direction with respect to the movement of the endless belt conveyor 1.

Secured to the elongate scoop 47 at or adjacent the shaft 46 is an upwardly extending link 48 which is pivotally connected, as at 49, to the outer end of the piston rod 51 of a fluid cylinder 53 which is, in turn, pivotally connected, as at 55 to the lower end of a bracket 57 which is secured to, and depends from, the lower ends of the rearward depending arms 32.

Thus, the upstream and normally lower end of the elongate scoop 47 may, by means of the operation of the fluid cylinder 53, be lowered and raised with respect to the upper flight of the endless belt conveyor 1. Thus, the lip or forward lower edge of the scoop 47 may pick-up suitable quantities of ore or other particulate material which is moving on the endless belt conveyor 1 in the direction of the arrow immediately thereabove.

The bottom of the forward end of the elongate scoop 47 is curved as indicated at 47a to facilitate the pick-up of substantial quantities of the particulate material.

As indicated earlier herein, the primary objective of the invention is to remove a longitudinally extending segment of the particulate material moving along and with the transversely concave upper flight of the endless belt conveyor 1, which is relatively narrow as compared with the total width of the endless belt conveyor and successively from one or more selected points across the width of the moving mass.

Accordingly, the elongate scoop 47 is relatively narrow and comprises a pair of vertically extending substantially flat side-walls 47b, and the top thereof comprises a substantially flat cover plate 47c which extends to the upper extremity of the scoop 47; but terminates in spaced relationship with respect to the lip at the forward end of the bottom of the scoop, thus leaving a material-receiving port 47d of substantially rectangular shape.

Mounted atop the elongate scoop 47 is a hingedly mounted cover plate 47e which may open and close the substantially rectangular material-receiving port 47d whenever desired.

Secured to and projecting upwardly from the scoop 47 is a hanger 62 which pivotally supports a depending fluid cylinder 64. As shown, the outer end of the piston rod of the fluid cylinder 64 is pivotally connected to the pivotally mounted cover plate 47e, whereby the movement of said cover plate into open and closed position may be controlled by said fluid cylinder.

The upper end of the pivotally-mounted elongate scoop 47 is open, and when the lower end of said scoop is in its uppermost position, the particulate material therein is discharged by gravity into an adjacently disposed hopper 65 which communicates with a cross-conveyor 70 which is disposed above and at right-angles to the endless belt conveyor 1. This cross-conveyor 70 transfers the particulate material to be analyzed to a suitable point of collection or distribution, as desired.

In order to prevent undesirable spreading of the particulate material on the transversely concave endless belt conveyor 1 at, and slightly in advance of, the lower portion of the (transversely) pivotally mounted elongate scoop 47, it may be found desirable to employ vertically disposed parallel skirts or side-guides 75 which are mounted above and adjacent the side edges of the endless belt conveyor and from a position which is below the pivotal mounting 46 of the elongate scoop 47 for a substantial distance upstream.

While all of the operating instrumentalities referred to herein, such as the fluid cylinders 43, 53 and 64 may be controlled manually, semi-automatic or fully automatic means may be utilized therefor. Such means may acceptably include time-controls for operating the apparatus at pre-selected intervals, as well as indexing devices for pre-selecting the lateral position of the elongate scoop 47 with respect to the endless belt conveyor 1 and the particulate material thereon.

However, such means form no part of the present invention and accordingly are neither shown in the drawings nor discussed more fully herein.

The present invention, therefore, is well-adapted to carry out the objects and obtain the ends and advantages mentioned, as well as others inherent therein. While the presently preferred embodiment of the invention has been given for the purposes of disclosure, numerous changes in the apparatus may be made which will readily suggest themselves to those skilled in the art and which are encompassed within the spirit of the invention and the scope of the appended claims.

I claim:

1. Apparatus for removing samples of particulate material directly from a substantially horizontally disposed and longitudinally moving endless belt conveyor comprising, in combination a frame a relatively narrow and normally vertically depending elongate scoop means mounted on said frame above said endless belt conveyor add pivotally mounted for swinging movement in an arc which extends longitudinally of, and in an upstream direction with respect to, said endless belt conveyor the lower end of said elongate scoop when in its lowermost position being proximate the upper surface of said endless belt conveyor and provided with an inlet port which faces upstream with respect thereto the upper end of said elongate scoop being provided with an outlet port for discharging particulate material from said scoop when the lower end thereof is in an elevated upstream position and means for receiving the particulate material as it is discharged by gravity from the outlet port of said elongate scoop when it is in the immediately aforementioned position said vertically depending elongate scoop being also pivotally mounted for swinging movement in an arc which extends transversely with respect to said endless belt conveyor whereby the position of said relatively narrow elongate scoop may be adjusted by moving the frame longitudinally with respect to the longitudinal center-line of said endless belt conveyor.

2. The apparatus of claim 1 wherein said endless belt conveyor is transversely concave, and the radius of the arc of movement of said elongate scoop transversely of said endless belt conveyor and the radius of the arc of the corresponding movement of said elongate scoop are similar.

3. The apparatus of claim 1, together with a closure for the inlet port at the lower end of said elongate scoop, said closure being adapted for movement into and out of operative position.

4. The apparatus of claim 1, wherein the means for maintaining the upper end of said elongate scoop in position above said endless belt conveyor comprises a substantially horizontal shaft disposed in substantial parallelism with respect to the longitudinal center-line of said endless belt conveyor said shaft being adapted for at least partial rotation a downwardly depending member secured to said shaft the lower end of said downwardly depending member being pivotally connected to the upper portion of said elongate scoop whereby the partial rotation of said shaft will move the lower end of said elongate scoop into adjusted positions transversely of said endless belt conveyor.

5. The apparatus of claim 1, together with
power-actuated means for moving said elongate scoop along the arc which extends longitudinally of said endless belt conveyor and
power-actuated means for moving said elongate scoop along the arc which extends transversely of said endless belt conveyor.

6. The apparatus of claim 5, together with power-actuated means for moving the closure for the inlet port at the lower end of said elongate scoop into and out of operative position.

* * * * *